US005669405A

United States Patent [19]

[11] Patent Number: 5,669,405

[45] Date of Patent: Sep. 23, 1997

Engelmann

[54] APPARATUS AND METHOD FOR AUTOMATICALLY DISABLING PRESSURE RELIEF VALVE OF BACKFLOW PREVENTER

[75] Inventor: Lester B. Engelmann, Woodland, Calif.

[73] Assignee: Ames Company, Inc., Woodland, Calif.

[21] Appl. No.: 713,884

[22] Filed: Sep. 17, 1996

[51] Int. Cl.[6] ........ G05D 11/00

[52] U.S. Cl. ........ 137/115.07; 251/282; 137/115.06; 137/115.12

[58] Field of Search ........ 137/115.01, 115.06, 137/115.07, 115.03, 487.5, 486, 115.13, 115.12, 115.25, 494; 251/282

[56] References Cited

U.S. PATENT DOCUMENTS

| | | | |
|---|---|---|---|
| 2,037,575 | 4/1936 | Hamilton | 137/115.12 |
| 2,624,980 | 1/1953 | Hughes | 137/115.07 |
| 3,448,763 | 6/1969 | Curtiss | 137/494 |
| 3,467,127 | 9/1969 | Schneider | 137/115.07 |
| 3,792,713 | 2/1974 | Zadoo | 137/466 |
| 4,550,747 | 11/1985 | Woodworth et al. | 137/487.5 |
| 5,046,525 | 9/1991 | Powell . | |

OTHER PUBLICATIONS

Installation Instructions (pp. 1–4) for "WFDT Vane-Type Waterflow Detector" published by System Sensor, St. Charles, Illinois; ©1991.

Installation And Maintenance Instructions (pp.194–197), Bulletins for Model 8210 and 8211 2-way Internal Pilot Operated Solenoid Valves, Normally Open, Diaphragm Type, published by Automatic Switch Co., Florham Park, New Jersey; ©1978.

Advertising Brochure for Model 5000ss Reduced Pressure Detector Assembly, published by Ames Company, Inc., Woodland, California; Rev. Feb. 1996.

*Primary Examiner*—Denise L. Ferensic
*Assistant Examiner*—Ramyar M. Farid
*Attorney, Agent, or Firm*—Lothrop & West

[57] ABSTRACT

An apparatus and method for automatic disablement of a pressure relief valve used in connection with a backflow preventer in a fire line. A normally open solenoid valve is included in a pressure sampling line, extending from an inlet, or upstream chamber to one side of the pressure relief valve. A water flow switch, interconnected to a power supply and the solenoid valve, is provided in the fire line. In response to water flowing through the fire line, the switch conducts, actuating the solenoid to a closed position. The solenoid thereby hydraulically isolates the inlet sensor line leading to the pressure relief valve. By maintaining high pressure in this portion of the sensor line, the pressure relief valve is effectively disabled. Thus, even if a check valve malfunction occurs, the pressure relief valve will not open and cannot cause a catastrophic loss of water pressure in the fire line.

25 Claims, 5 Drawing Sheets

APPARATUS AND METHOD FOR AUTOMATICALLY DISABLING PRESSURE RELIEF VALVE OF BACKFLOW PREVENTER

BACKGROUND OF THE INVENTION

1. Field of the Invention

The invention relates generally to fire line backflow preventers, equipped with a pressure relief valve operating on the "reduced pressure" principle. More specifically, the invention pertains to an apparatus and a method, for automatically disabling the pressure relief valve of a backflow preventer while water is flowing through a fire line. The invention thereby prevents a catastrophic loss of water pressure through the pressure relief valve, in the event of a check valve malfunction prior to or during the course of a fire.

2. Description of Prior Art

Backflow preventers are used within fire lines, providing water to sprinkler systems and fire hydrants within manufacturing plants, office buildings, hotels, apartments, and the like. Such backflow preventers are typically installed near the interconnection between the fire line and a municipal water supply line.

Within the backflow preventer housing, a pair of check valves is arranged in serial relation, allowing only a unidirectional flow of water through the housing. The purpose of the pair of check valves is to provide redundant protection against contamination of the municipal water supply, in the event chemical or organic impurities enter the fire line through backpressure or backsiphonage.

Backpressure occurs when there is a downstream buildup in pressure within the fire line, resulting in a downstream pressure which is greater than the nominal pressure in the water supply system. Backsiphonage occurs when there is a catastrophic drop or loss of pressure in the water supply system. Such a drop in pressure may result from a broken main, or a large water draw on another fire line resulting from efforts to extinguish a fire.

Backflow preventers used in high hazard environments may also incorporate a special spring-loaded, pressure relief valve, operating on the "reduced pressure" principle. The pressure relief valve constantly monitors the pressure differential which exists between an inlet chamber and an intermediate chamber of the backflow preventer. During normal operation, the pressure within the intermediate zone or chamber, located between the upstream and downstream check valves, is at least five pounds per square inch (psi) less than the pressure within the inlet chamber, on the inflow side of the upstream check valve. This pressure differential, caused by the hydraulic pressure loss across the upstream check valve, overcomes the spring bias of the pressure relief valve, and maintains the valve in a closed position.

However, if the upstream check valve has either failed or has been jammed open by an object, the pressure differential will be less than nominal. Under such a condition, the spring of the pressure relief valve opens the valve member, allowing fluid to pass from the intermediate chamber through a valve discharge port, and into the surrounding environment. This release of fluid visually serves to notify personnel or building occupants of the check valve malfunction and the necessity for immediate attention. Thus, the advantage of a such a pressure relief valve, is that it provides immediate visual notification of a check valve problem, so that remedial action can be taken before a backflow or backsiphonage condition arises.

Manufacturers and regulators of fire protection equipment are concerned about the safety of the backflow preventer/pressure relief valve combination. What happens if the pressure relief valve discharges during a fire? When a fire line is called upon to provide a nearly instantaneous large flow of water, rust, corroded metal parts or mineral deposits within the municipal line may become dislodged, and jam within the first check valve. Alternative sources of water, such as a reservoir, lake or fiver may also be relied upon to supply water for the fire line. Such sources typically include rock, sticks, and other debris capable of jamming the first check valve. If jamming occurs, the required nominal pressure differential between the upstream and intermediate chambers may not be maintained, and the relief valve will open. Discharge of water through the pressure relief valve will cause an overall loss of water pressure in the fire line, and potentially compromise efforts to extinguish the fire.

Therefore, a need exists for a simple and inexpensive apparatus and method, which automatically disable the pressure relief valve of a backflow preventer in a fire line, when the fire line is called upon to provide water to extinguish a fire.

The need also exists for an apparatus and method, which warns fire protection agencies and personnel immediately about the malfunction of a check valve in a backflow preventer in a fire line, so that condition can be remedied before a fire emergency arises.

SUMMARY OF THE INVENTION

The present invention represents an improvement over the known art by substantially eliminating any drawbacks associated with the use of a pressure relief valve equipped backflow preventer, in a fire line.

A water flow detection switch, preferably having a low volume trigger threshold and an instantaneous response time, is installed in a fire line. The switch is preferably designed to respond only to forward flow through the fire line. A power supply is series-connected through the switch contacts, thereby providing electrical power at the switch's output, at the onset of water flow through the fire line. Alternatively, the electrical output pulses of a water flow meter in the fire line may be used to latch an electrical switch. This switch, in turn, may be used to control the output of a power supply, equivalently providing electrical power in response to water flow.

It is preferred that the water flow switch or meter be located upstream from the pressure relief valve, to ensure the quickest and most reliable detection of any flow of water through the fire line.

An electrically powered solenoid valve is positioned within a first sensor line, leading from an upstream, inlet chamber of the backflow preventer to the pressure relief valve. The solenoid valve is normally open, allowing water under pressure freely to flow from the inlet chamber to a movable diaphragm within the pressure relief valve. Electrical lines interconnect the solenoid valve with the output of the water flow meter/switch and the power supply.

In response to water flowing forwardly through the fire line for whatever reason, the solenoid valve is actuated, hydraulically isolating the portion of the first sensor line between the solenoid valve and the pressure relief valve. Whatever water pressure existed in that portion of the sensor line when the valve is actuated is thereby maintained, irrespective of subsequent pressure drops which might occur in the inlet chamber. A nominal pressure differential between this portion of the first sensor line, and a second sensor line leading from the pressure relief valve to an intermediate chamber of the backflow preventer, is thereby also maintained. As a consequence, the pressure relief valve remains closed and disabled, as long as water flows through the fire line.

When forward water flow through the fire line ceases, the solenoid valve is deactivated, and hydraulic communication between the pressure relief valve and the inlet chamber is reestablished. Normal operation of the relief valve also resumes, so that the valve will open and discharge water in the event that a nominal pressure differential between the inlet chamber and the intermediate chamber is not sensed.

DETAILED DESCRIPTION OF THE PREFERRED EMBODIMENT

Figure 1:
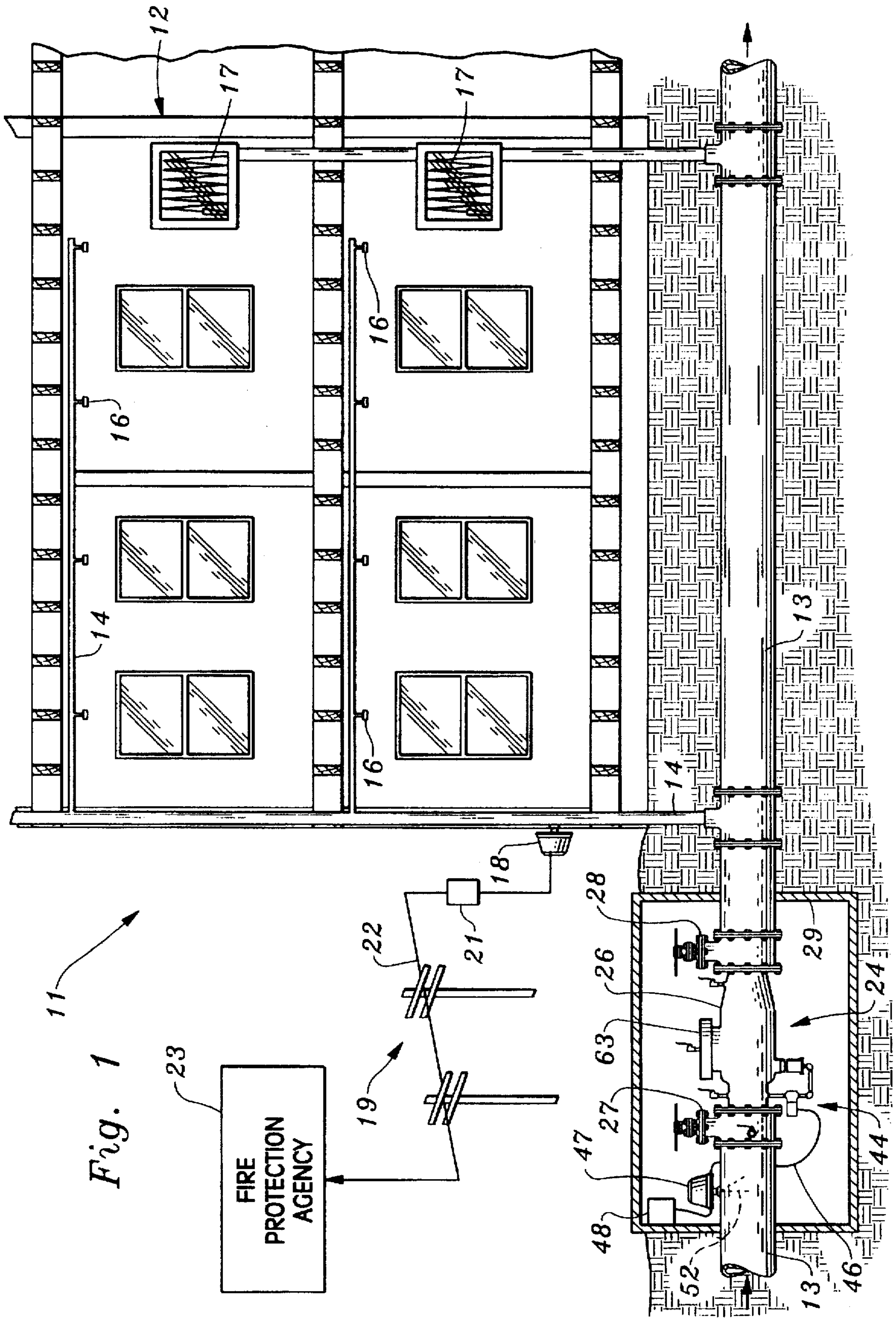
FIG. 1 is a diagrammatic, cross-sectional view of one embodiment of the invention, showing a fire line for a building, including a pressure relief valve equipped backflow preventer and an existing automatic fire detection system.

Turning now to the drawings, FIG. 1 shows the apparatus 11 of the present invention, including a fragmentary, cross-sectional view of a building 12, serviced by a main fire line 13. Typically, a sprinkler line 14 is included in a commercial fire protection system, diverting a portion of the water from the fire line and distributing it to a plurality of heat-actuated sprinklers 16, located throughout the building. Sprinklers 16 usually include a fusible element adapted to melt in response to a predetermined amount of heat, allowing a sprinkler valve to open automatically. Also, one or more housed fire hoses 17, or fire hydrants (not shown), are also interconnected to the fire line 13.

A sprinkler line water flow switch 18 is included, as part of a conventional automatic fire detection system 19. Switch 18 may be a vane-type waterflow detector, such as the "WFDT" detector, sold by System Sensor of St. Charles, Ill. Usually, fire line waterflow detectors include a pneumatic delay mechanism, or the equivalent, which delays the action of the switch contacts for a predetermined period of time. The purpose of the delay is to prevent the occurrence of false alarm signals in response to temporary pressure flow surges, which normally occur in water lines. The delay is such that the sensor vane within the water line must continuously be deflected for approximately 30 seconds, before the internal contacts within the switch will make a complete circuit.

Switch 18 is interconnected to a sprinkler/fire alarm control panel 21, including an internal power supply, switching circuitry and a telephone line interface. A telephone line 22 provides a communication link between panel 21 and a fire protection agency 23, such as a central fire dispatch or an individual fire station. In response to an incipient fire condition, a sprinkler 16 opens, allowing water to flow continuously through line 14. After a predetermined delay, water flow switch 18 conducts and an alarm signal is sent over line 22 to agency 23.

A backflow preventer 24 is provided within fire line 13, between the building 12 and the upstream municipal water line (not shown). Preventer 24 includes a tubular housing 26, bolted at one end to an upstream gate valve 27 and at the other end to a downstream gate valve 28. Preventer 24 and the gate valves may be located underground within a vault 29. Alternatively, the preventer may be mounted above ground, or within the building itself in a dedicated service room.

Figure 2:
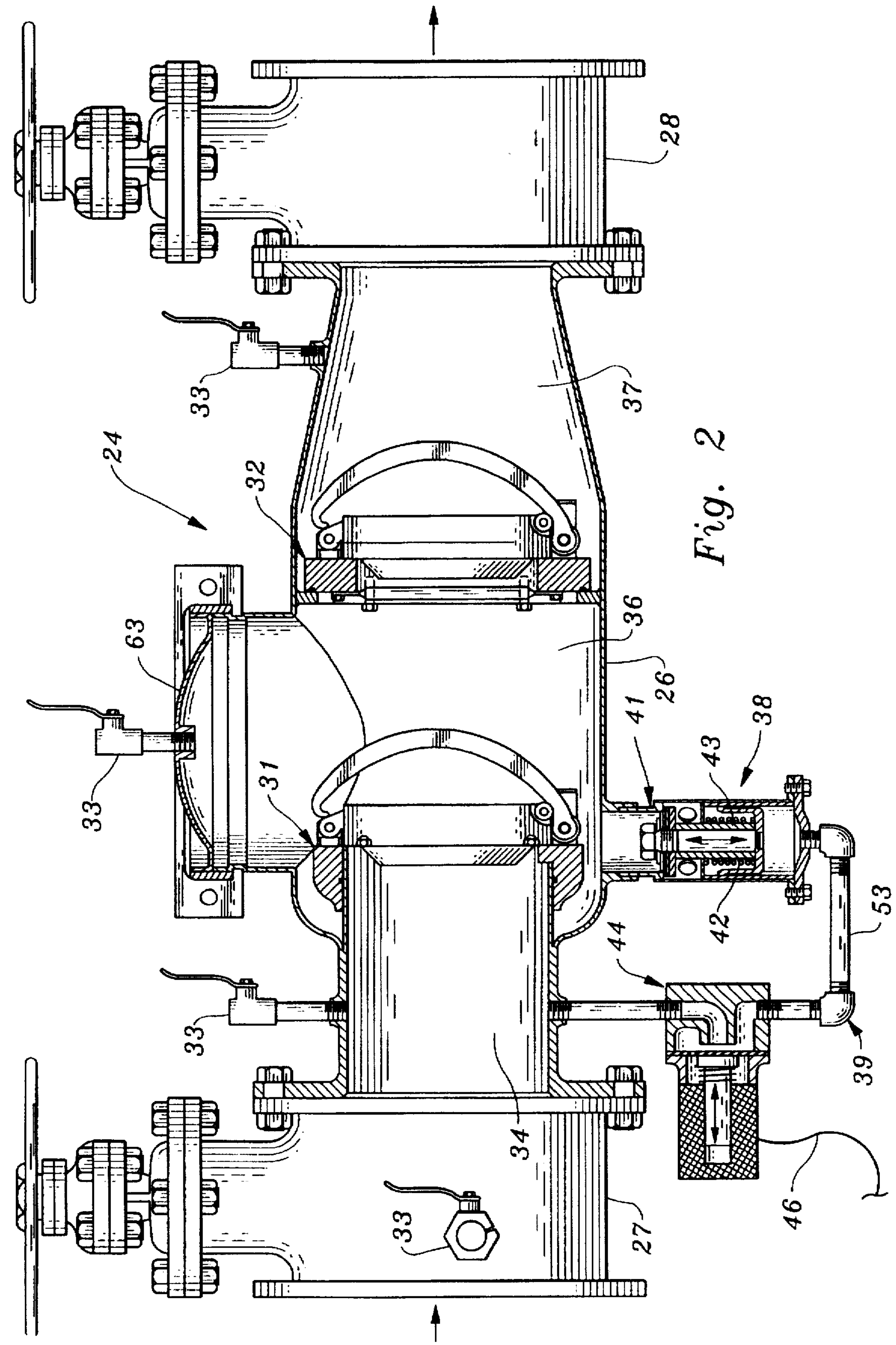
FIG. 2 is a median, longitudinal, cross-sectional view of a backflow preventer with the main check valves in a closed position, and further incorporating a pressure relief valve with a solenoid valve in the first sensor line.

FIG. 2 illustrates certain inner details of the backflow preventer 24, and associated components of the present invention. An upstream check valve 31 and a downstream check valve 32, are serially and transversely positioned within housing 26. Preferably, these check valves are differentially loaded check valves, such as those disclosed in U.S. Pat. No. 5,046,525, assigned to a common assignee with the present application. U.S. Pat. No. 5,046,525 is hereby incorporated by reference into the present disclosure. The check valves in FIG. 2 are shown in their normally closed position, characteristic of a static water flow condition for a fire line. Backflow preventer 24 also includes a plurality of test cocks 33, used by service technicians to sample water pressures at various locations within the housing.

Check valves 31 and 32 divide the backflow preventer into three distinct chambers, inlet chamber 34, intermediate or zone chamber 36, and outlet chamber 37. Upstream check valve 31 includes a closing, or bias spring selected to effect a 5 psi pressure loss across the valve. In other words, if the water pressure in inlet chamber 34 is 100 psi, then the pressure within intermediate chamber will be 95 psi. In contrast, check valve 32 has a bias spring which results in only a 2 psi pressure loss across the valve 32, from the intermediate chamber to the outlet chamber.

A pressure relief valve 38 includes a first sensing line 39 and a second sensing line 41. First sensing line 39 places one portion of valve 38 into hydraulic communication with inlet chamber 34. Another portion of valve 38 is hydraulically linked to intermediate chamber 36 by means of second sensing line 41. A spring 42 biases a movable piston and rolling diaphragm assembly 43 into a normally open position (not shown), with a force equivalent to 2 to 3 psi. However, with a nominal pressure differential of 5 psi between inlet chamber 34 and intermediate chamber 36, pressure relief valve is urged into a closed position, as shown in FIG. 2.

A normally open solenoid valve 44 is included within first sensing line 39, between inlet chamber 34 and pressure relief valve 38. Solenoid valve 44 may be of various designs, including mechanisms effecting translational or rotary operation of a valve member. However, one commercially available valve, a 2-way internal pilot operated solenoid valve, using a diaphragm sealing member, has proven particularly advantageous during a certain fault condition to be described more fully herein. This solenoid valve is a Model 8210, manufactured by Automatic Switch Company, of Florham Park, N.J. It should be noted from FIG. 2, that valve 44 is mounted in a direction reverse that, from the orientation normally recommended by the manufacturer. In other words, the "inlet" designated by the valve manufacturer is interconnected to relief valve 38, and the designated "outlet" is interconnected to the inlet chamber 34. The reason for such a valve orientation will be evident from the discussion to follow.

Although an electro-mechanical valve is preferred by the applicant, other equivalent structures may be used. For example, a purely mechanical system may be used, providing it is appropriately actuated by water flowing through line 13, as disclosed herein.

Valve 44 has a power line 46, leading to a fire line flow switch 47. A power supply 48 is also included, providing electrical power of the appropriate voltage and current sufficient to actuate valve 44. Preferably, power supply 48 will be interconnected to the commercial power mains, but will also include a battery backup, or the like, in the event of a power failure. Valve 44, switch 47 and power supply 48 are series-connected so that when the internal contacts of switch 47 make, power is applied to solenoid valve 44.

Figure 4A:
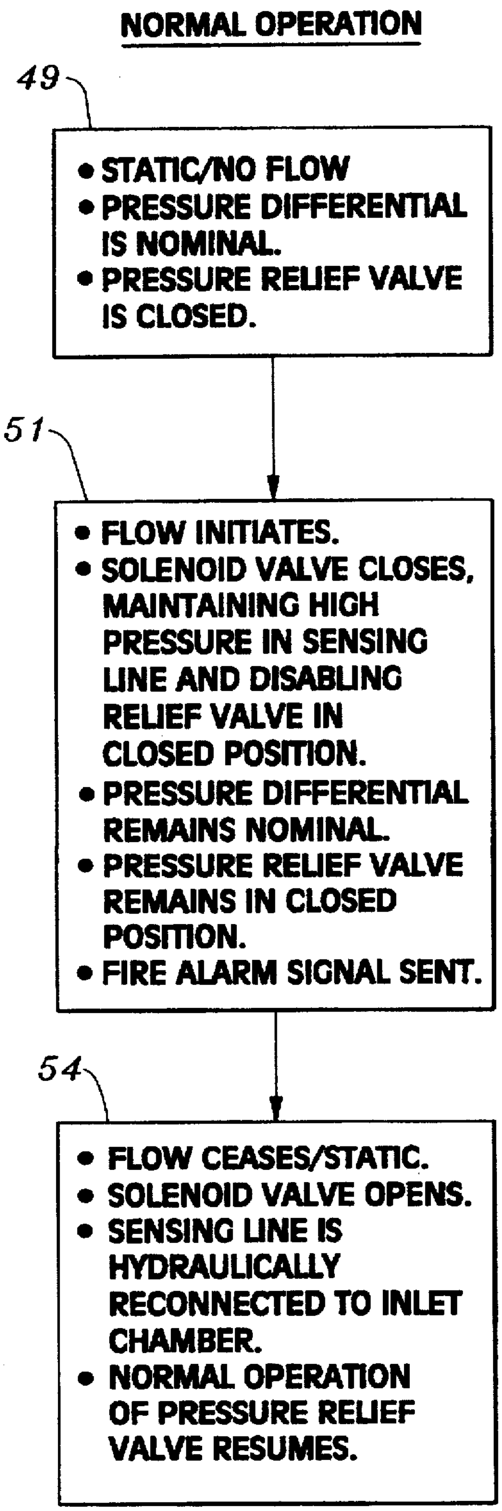
FIG. 4*a* is a flow chart showing a normal operational sequence for the invention, during static and flow conditions.

Turning now to FIG. 4*a*, the normal operation of the apparatus 11 is explained. In the first phase, set forth in box 49, there is a static, no flow condition within fire line 13. In addition, the pressure differential between inlet chamber 34 and intermediate chamber 36 is nominal, assuring that pressure relief valve 38 remains in a closed position.

In the second phase, explained in box 51, water flow begins in fire line 13. Such flow would result from a sprinkler 16 turning on, in the embodiment of the invention shown in FIG. 1. Water flow switch 47 includes a vane or paddle 52, which is deflected downstream by the flow, instantaneously to make the switch contacts. It should be noted that rather than displaying a delayed response, it is desirable for the fire line flow switch to act as quickly as water begins flowing through the line. This rapid action is desirable in the event a fault condition in the backflow preventer arises before the sprinkle line flow switch actuates.

In response to the application of electrical power passed by switch 47, the solenoid valve closes, thereby hydraulically isolating the portion 53 of sensing line 39, between valve 44 and valve 38. In effect, this maintains the high water pressure which existed within inlet chamber 34 at the moment water began to flow. This also automatically disables pressure relief valve 38 and maintains the valve in a closed position, as the high pressure continues to be impressed on the valve 38 from the isolated portion 53 of the first sensing line. The pressure differential between chambers 34 and 36 remains nominal, and the relief valve 38 stays closed. After approximately 30 seconds of flow, the sprinkler line water flow switch 18 conducts, and a fire alarm signal is sent to the fire protection agency 13.

It should be noted that the solenoid valve 44 could be connected directly to flow switched power circuitry of the control panel 21, effecting actuation of the solenoid simultaneously with issuance of the fire alarm signal. This has the advantage of simplicity, in that the independent flow switch 47 and the separate power supply 48 are eliminated However, as noted above, this arrangement provides only delayed disablement of the pressure relief valve, since it depends upon an actuation signal from the sprinkler alarm system. Nevertheless, some of the advantages of the present invention are realized, just by interconnecting the solenoid valve to a component of an existing sprinkler alarm system.

The third phase, summarized in box 54, represents a return to a static phase, when water flow through line 13 ceases. The contacts of water flow switch 47 open, interrupting the flow of power to solenoid valve 44. The solenoid valve then opens, hydraulically reconnecting the relief valve and the inlet chamber. Normal operation of the pressure relief valve resumes, as both sensing lines are again fully operational. Thus, the embodiment of the invention shown in FIG. 1, is effective under normal operating conditions, automatically to disable the pressure relief valve during water flow, and then to restore normal operation of the valve after flow through the water line ceases.

Figure 4B:
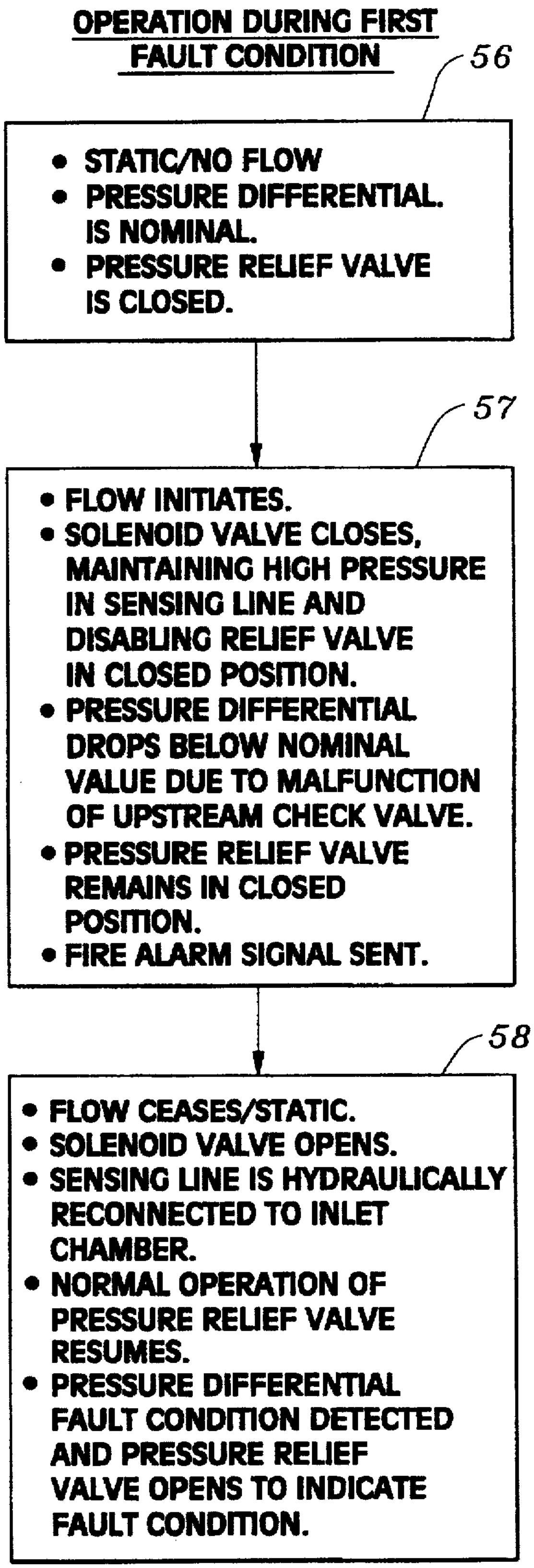
FIG. 4*b* is a flow chart showing operation of the invention during a first fault condition, arising after flow of water through the fire line commences; and, FIG. 4*c* is a flow chart showing operation of the invention during a second fault condition, arising before flow of water through the fire line commences.

In addition to normal operation of the apparatus, two fault conditions may arise owing to malfunctions in the backflow preventer. The first of these fault conditions is described in the flow chart of FIG. 4*b*. This fault condition is one precipitated by a fire event, such that after flow of water through the fire line begins, the upstream check valve malfunctions. Such a malfunction may occur when the valve becomes jammed open by debris, or the closing, bias spring on the valve fails.

In the first phase, described within box 56, there is no water flow, the pressure differential between the inlet chamber and the intermediate chamber is nominal, and the pressure relief valve is closed.

The second phase includes a series of events listed within box 57. After water flow begins, the solenoid valve closes, maintaining high pressure in the isolated portion 53 of the sensing line, and disabling the pressure relief valve in a closed position. Now, however, a malfunction of upstream check valve 31 occurs, and the pressure differential existing between the inlet and intermediate chambers is no longer nominal. The pressure relief valve would normally open now, but it is disabled in a closed position, owing to the hydraulically locked higher water pressure, which has been preserved in portion 53 of the first sensing line. Since water is incompressible the relief valve cannot stroke to the open position due to the close chamber portion 53 created by the closed solonoid valve. Again, following approximately 30 seconds of continuous water flow, a fire alarm signal is sent from control panel 21.

After the fire is extinguished and water ceases to flow through the fire line, the third phase of operation begins. The steps of phase three are described within box 58. When the static condition returns, the solenoid valve opens, hydraulically reconnecting the inlet chamber and the pressure relief valve. As normal operation of the pressure relief valve resumes, the pressure differential fault condition is detected, and the pressure relief valve opens to discharge water. Personnel note the discharging water, and undertake repair of the backflow preventer. Notwithstanding the fault condition which existed during the fire, the pressure relief valve did not open since it was immediately disabled when flow commenced through the fire line.

Figure 4C:
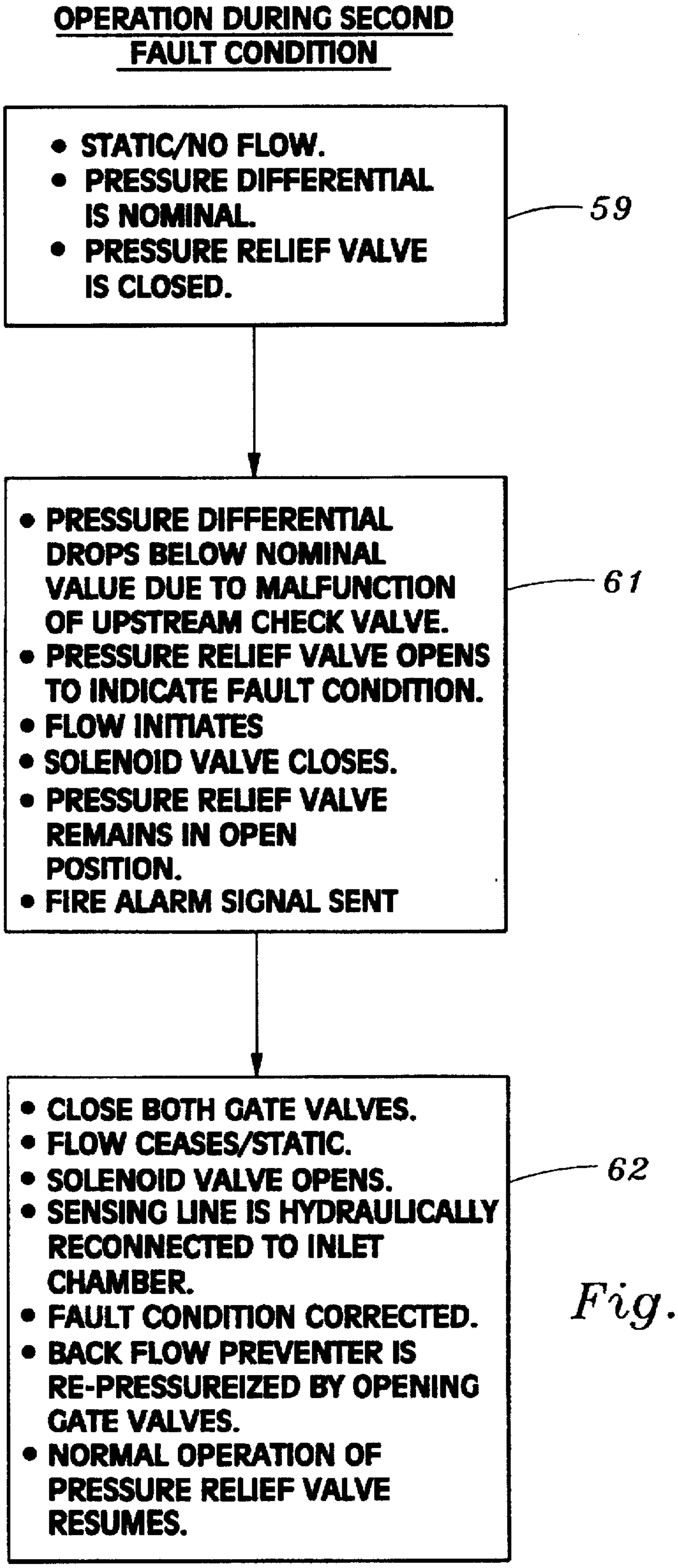

A second fault condition is shown in detail in FIG. 4*c*. This fault condition arises where the backflow preventer malfunctions before a fire occurs. This malfunction could result from a weakened, valve bias spring or a fouled seal, in the upstream check valve. Under such a condition, the malfunction should be detected and repaired immediately, before a fire ensues. Even though the pressure relief valve is designed to discharge water when the upstream check valve malfunctions, the discharge may not be noticed for hours or days, depending upon circumstances. Therefore, a second embodiment of the invention was developed, to deal most effectively with this second fault condition.

Figure 3:
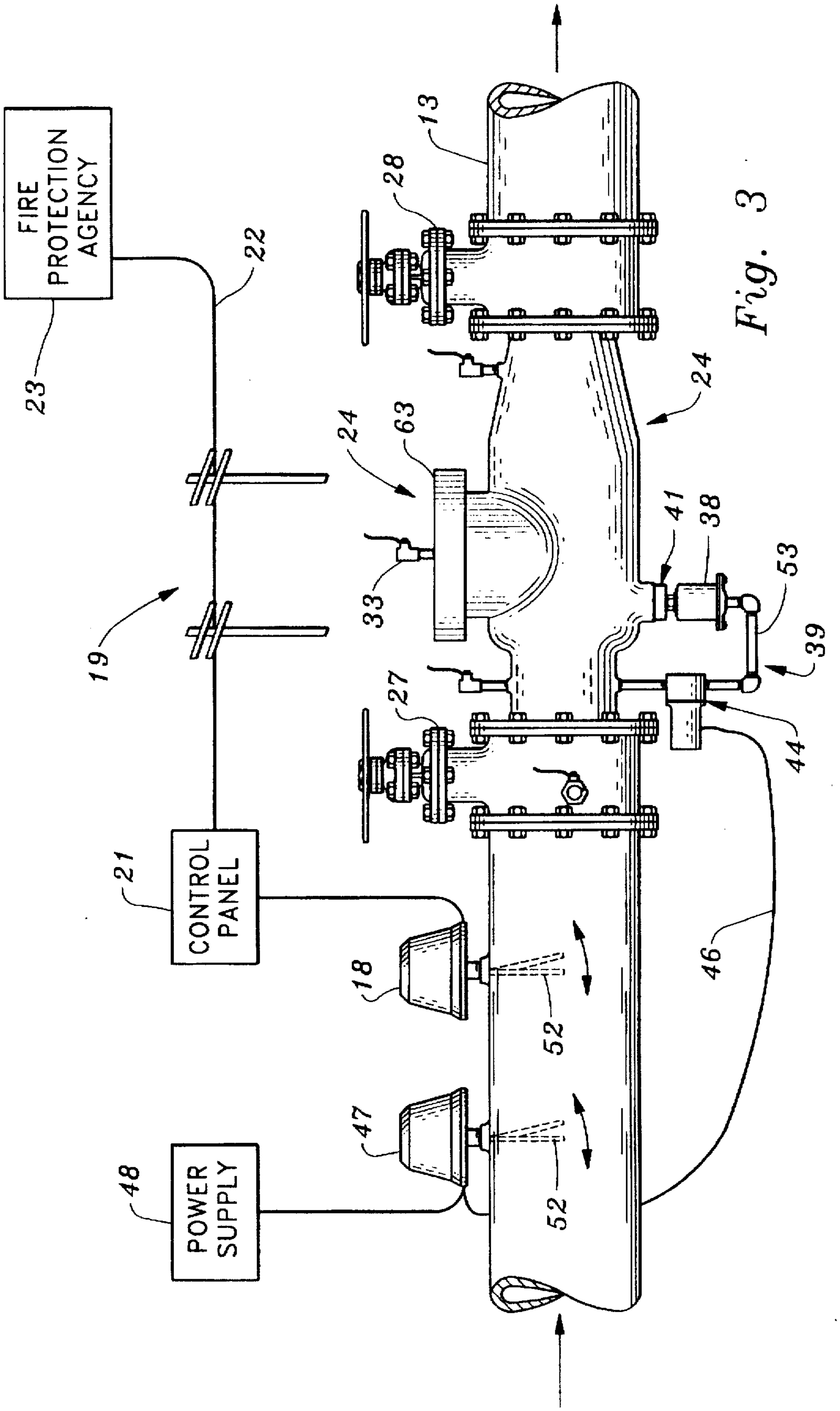
FIG. 3 is a fragmentary representation of an alternative meter form of the invention, in which the water flow meter for the automatic fire detection system is located upstream from the backflow preventer.

The second embodiment of the invention is shown in FIG. 3. It should be noted from the outset that the only difference between the first and second embodiments, is the relocation of a certain component of the fire detection system 19. In FIG. 3, the sprinkler line water flow switch 18 is located adjacent the fire line switch 47, immediately upstream from the backflow preventer. Through the simple expedient of relocating the switch 18, an entirely new and useful function is provided. No other discussion of the general structure and operation of the components of the second embodiment is required, since they are identical to that previously discussed for the first embodiment.

Returning now to FIG. 4c, the operation of the second embodiment under the second fault condition is described. The first static phase of operation is shown within box 59, in which the pressure differential is nominal and the pressure relief valve is closed.

In the second phase, a series of events occurs, all stemming from an independent failure of the upstream check valve. Box 61 lists each of these events sequentially. When the upstream check valve 34 malfunctions, the pressure differential between the inlet chamber and the intermediate chamber drops below the nominal value of 5 psi. The pressure relief valve detects this condition, and opens in response. As water discharges from the pressure relief valve, the water flow deflects paddles 52, depending from the switches 18 and 47. Immediately, the solenoid valve closes. However, since the pressure differential between the inlet chamber and the intermediate chamber is already less than nominal, closing off the first sensing line is without effect. The pressure relief valve remains open, and water flow continues. After 30 seconds, the contacts within switch 18 conduct, and a fire alarm signal is sent by control panel 21 to fire protection agency 23.

Since there is no real fire, the alarm is, in effect, a false alarm. Nevertheless, when the site is reached by the fire department personnel, a check of the facility will reveal the water discharge from the pressure relief valve.

The third phase of this operation, involves repairing the backflow preventer. Box 62 shows the various steps involved with this process. After closing both of the gate valves 27 and 28, flow into the backflow preventer ceases, and the solenoid valve 44 opens. First sensing line 39 is thereby hydraulically reconnected to the inlet chamber, but the pressure relief valve remains open since nominal pressure differential has not yet been reinstated. By removing bonnet 63, access to the interior of the backflow preventer is achieved and the malfunctioning check valve can be repaired or replaced. After correcting the malfunction, the bonnet 63 is reinstalled, and the gate valves are reopened.

Upon repressurization of the backflow preventer, nominal pressure differential between the inlet chamber and the intermediate chamber is reestablished, and the pressure relief valve closes. Thus, the second embodiment of the invention successfully detects the incipient fault condition, and immediately alerts fire personnel of that fact. In that manner, repair is undertaken quickly before a fire situation arises.

Lastly, there is one further circumstance which could occur during the above-described, independent fault condition. It is possible that following an independent failure of the check valve, but before the valve is repaired, a fire occurs. With the pressure relief valve open, the tremendous forces from high water flow free or break up the jamming debris, and nominal pressure differential across check valve 31 is reestablished. This reduces opening pressure exerted on the relief valve through sensing line 41. Normally, the pressure relief valve would sense the pressure differential, and close. Unfortunately, owing to the existing water flow, the flow switch is actuated, and the solenoid valve remains closed. Consequently, the high pressure in the inlet chamber will not pass through a conventional solenoid valve, to close the pressure relief valve. The continuing discharge from the pressure relief valve compromises the quantity and pressure of water available to quench the fire.

However, if the solenoid valve 44 is of the diaphragm design, described above, it only prohibits flow in one direction. It is evident from FIG. 2, that valve 44 has a relatively large "inlet" chamber surrounding an "outlet" elbow. A bleed hole (not shown) is also included in the diaphragm to allow water pressure to equalize on both sides of the diaphragm. When the valve is closed, high pressure in the "inlet" chamber tends to form a tighter seal between the diaphragm and the upper edge of the "outlet" elbow. However, even when the valve is closed, high pressure within the "outlet" elbow will overcome the diaphragm seal, and cause reverse flow through the solenoid valve.

Therefore, if the solenoid valve is installed in the "reverse" direction, so that its "inlet" is directed toward the pressure relief valve and its "outlet" is connected to the inlet chamber (see FIG. 2), flow of water when the valve is closed, will only be inhibited from the pressure relief valve to the inlet chamber. In other words, water flow in the reverse direction, from the inlet chamber to the pressure relief valve can still occur, notwithstanding the closed position of the valve. This will allow the high pressure to reach the diaphragm of the pressure relief valve, and urge the valve 38 into a closed position. Thus, in this unlikely but possible scenario, the use of a diaphragm solenoid in the apparatus will provide an extra measure of safety.

It will be appreciated, then, that I have disclosed herein two embodiments of an apparatus and method, which effect automatic disablement of pressure relief valves used in backflow preventers within fire lines.

What is claimed is:

1. In a backflow preventer within a water line, the preventer including a housing having an upstream check valve and a downstream check valve transversely positioned therein, the upstream check valve defining an upstream chamber and an intermediate chamber, and the downstream check valve further defining a downstream chamber, an apparatus for automatically disabling a pressure relief valve hydraulically connected across the upstream check valve between the upstream chamber and the intermediate chamber of the backflow preventer, said apparatus comprising:

a. water flow detector means, producing an output signal when water flows through the water line at a predetermined rate; and, b. normally open electro-mechanical valve means on an upstream side of the pressure relief valve, said valve means closing in response to said output signal and hydraulically isolating the pressure relief valve from the upstream chamber.

2. An apparatus as in claim 1 in which said water flow detection means is a water flow switch having a sensing element within the water line.

3. An apparatus as in claim 2 further including a power supply interconnected to said switch.

4. An apparatus as in claim 1 in which said valve means is a solenoid valve.

5. An apparatus as in claim 1 in which said valve means is a solenoid valve having a diaphragm as a valve member, and in which said valve has a designated input connected to the pressure relief valve and a designated output connected to the upstream chamber.

6. An apparatus as in claim 1 in which said water flow detection means is located upstream from the backflow preventer.

7. In a water line backflow preventer, the preventer including a housing having an upstream check valve and a downstream check valve transversely positioned therein, the upstream check valve defining an upstream chamber and an intermediate chamber, and the downstream check valve further defining a downstream chamber, and further including a pressure relief valve having a first sensing line in communication with the upstream chamber and having a second sensing line in communication with the intermediate chamber, the improvement comprising:

a. a water flow detector, producing an output signal when a predetermined rate of flow through the water line is detected;

b. a normally open solenoid valve, located within said first sensor line and interconnected to said water flow detector, said solenoid valve closing in response to said output signal and hydraulically isolating the pressure relief valve from the upstream chamber.

8. An apparatus as in claim 7 in which said flow detector is located upstream from the backflow preventer.

9. An apparatus as in claim 7 in which said solenoid valve has a diaphragm as a valve member, and in which said valve has a designated input connected to the pressure relief valve and a designated output connected to the upstream chamber.

10. In a water line backflow preventer having a housing with an upstream check valve and a downstream check valve transversely positioned therein, the upstream check valve defining an upstream chamber and a intermediate chamber, and the downstream check valve further defining a downstream chamber, and further including a pressure relief valve having a first sensing line interconnected to the upstream chamber, and having a second sensing line interconnected to the intermediate chamber, said apparatus comprising:

a. a water flow detector, producing an output signal when a predetermined rate of flow through the water line is detected;

b. a normally open solenoid valve, located within said first sensing line and interconnected to said water flow detector, said solenoid valve closing in response to said output signal and hydraulically isolating the pressure relief valve from the upstream chamber.

11. An apparatus for disabling the pressure relief valve of a water line backflow preventer, the preventer including a housing having an upstream check valve and a downstream check valve transversely positioned therein, the upstream check valve defining an upstream chamber and a intermediate chamber, and the downstream check valve further defining a downstream chamber, the pressure relief valve having a first sensing line interconnected to the upstream chamber, and having a second sensing line interconnected to the intermediate chamber, said apparatus comprising:

a. means for sampling the water line and producing an output signal when a predetermined rate of flow therethrough is detected;

b. means for closing off the first sensing line in response to said output signal, thereby hydraulically isolating the pressure relief valve from the upstream chamber.

12. An apparatus as in claim 11 in which the water line is a fire line.

13. An apparatus as in claim 11 in which said water flow sampling means is a water flow switch having a sensing element within the water line.

14. An apparatus as in claim 13 further including a power supply interconnected to said switch.

15. An apparatus as in claim 11 in which said closing means is a solenoid valve.

16. An apparatus as in claim 11 in which said closing means is a solenoid valve having a diaphragm as a valve member, and in which said valve has a designated input connected to the pressure relief valve and a designated output connected to the upstream chamber.

17. An apparatus as in claim 11 in which said water flow sampling means is located upstream from the backflow preventer.

18. An apparatus as in claim 11, further including means for reopening the first sensing line, when said predetermined rate of flow is no longer detected, thereby re-enabling the pressure relief valve.

19. In a fire line including a backflow preventer, the preventer including a housing having an upstream check valve and a downstream check valve trasnversely positioned therein, the upstream check valve defining an upstream chamber and an intermediate chamber, and the downstream check valve further defining a downstream chamber, an apparatus for automatically disabling a pressure relief valve hydraulically connected across the upstream check valve between the upstream chamber and the intermediate chamber of the backflow preventer, said apparatus comprising:

a. water flow detector means, producing an output signal when water flows through the water line at a predetermined rate; and, b. normally open electro-mechanical valve means on an upstream side of the pressure relief valve, said valve means closing in response to said output signal and hydraulically isolating the pressure relief valve from the upstream chamber.

20. An apparatus as in claim 19 further including means for sending a fire alarm signal to a remote location in response to flow within the fire line.

21. An apparatus as in claim 20 in which said fire alarm signal means includes a sprinkler line water flow switch.

22. An apparatus as in claim 21 in which said water flow switch is located upstream from the backflow preventer.

23. A method for disabling the pressure relief valve of a water line backflow preventer, the preventer including a housing having an upstream check valve and a downstream check valve transversely positioned therein, the upstream check valve defining an upstream chamber and an intermediate chamber, and the ,downstream check valve further defining a downstream chamber, the pressure relief valve having a first sensor line interconnected to the upstream chamber, and having a second sensor line interconnected to the intermediate chamber, said method comprising the steps of:

a. sampling the water line and producing an output signal when a predetermined rate of flow therethrough is detected;

b. closing off the first sensor line in response to said output signal, thereby hydraulically isolating the pressure relief valve from the upstream chamber.

24. A method as in claim 23 further including the step of reopening the first sensor line, when said predetermined rate of flow is no longer detected, thereby re-enabling the pressure relief valve.

25. A method as in claim 23 further including the steps of sampling the water line from a point upstream from the backflow preventer and producing an alarm signal in response to water flow therethrough.

* * * * *